United States Patent
Showalter et al.

(10) Patent No.: US 7,840,597 B2
(45) Date of Patent: Nov. 23, 2010

(54) METHOD AND APPARATUS FOR MANAGING METADATA ASSOCIATED WITH ENTITIES IN A COMPUTING SYSTEM

(75) Inventors: James Lee Showalter, Los Gatos, CA (US); Jeffrey M. Collins, San Mateo, CA (US)

(73) Assignee: Intuit Inc., Mountain View, CA (US)

( * ) Notice: Subject to any disclaimer, the term of this patent is extended or adjusted under 35 U.S.C. 154(b) by 433 days.

(21) Appl. No.: 12/023,336

(22) Filed: Jan. 31, 2008

(65) Prior Publication Data

US 2009/0198708 A1    Aug. 6, 2009

(51) Int. Cl.
*G06F 17/30* (2006.01)
(52) U.S. Cl. ...................................... 707/790
(58) Field of Classification Search ............ 707/1, 707/3, 790; 709/223
See application file for complete search history.

(56) References Cited

U.S. PATENT DOCUMENTS

| | | | | |
|---|---|---|---|---|
| 5,907,705 A * | 5/1999 | Carter | ................. | 717/122 |
| 2003/0101169 A1 * | 5/2003 | Bhatt et al. | .............. | 707/3 |
| 2004/0216094 A1 * | 10/2004 | Bosworth et al. | ............ | 717/141 |
| 2005/0021713 A1 * | 1/2005 | Dugan et al. | ................. | 709/223 |
| 2006/0143148 A1 * | 6/2006 | Degtyar et al. | ................ | 707/1 |
| 2006/0200478 A1 * | 9/2006 | Pasztor et al. | ............... | 707/100 |
| 2007/0150651 A1 * | 6/2007 | Nemiroff et al. | ............ | 711/114 |
| 2008/0127348 A1 * | 5/2008 | Largman et al. | .............. | 726/24 |

* cited by examiner

*Primary Examiner*—Etienne P LeRoux
(74) *Attorney, Agent, or Firm*—Park, Vaughan, Fleming & Dowler LLP

(57) ABSTRACT

One embodiment of the present invention provides a system that facilitates managing metadata associated with entities and entity types in a computing system. During operation, the system initializes a global static metadata cache containing global static metadata at the computing system. Next, the system initializes a global dynamic metadata cache containing global dynamic metadata at the computing system. The system then receives a command to initialize a session at the computing system. In response to the command, the system determines a realm for the session, wherein the realm is a virtual private partition of the computing system. The system then initializes a realm-scoped dynamic metadata cache containing realm-scoped dynamic metadata associated with the realm at the computing system. Finally, the system executes operations on the computing system in compliance with the global static metadata, the global dynamic metadata, and the realm-scoped dynamic metadata.

25 Claims, 3 Drawing Sheets

COMPUTING ENVIRONMENT 100

METHOD AND APPARATUS FOR MANAGING METADATA ASSOCIATED WITH ENTITIES IN A COMPUTING SYSTEM

BACKGROUND

Related Art

To minimize costs while providing enterprise services to small businesses and organizations, service providers typically partition enterprise systems into a number of virtual private domains, wherein each organization's data and applications reside in one or more of these virtual private domains. These virtual private domains isolate each organization so that any particular organization only has access to their own data and services.

Although creating virtual partitions on enterprise servers provides many benefits, this technique also has some inherent drawbacks. For example, it can be very difficult to provide customizations of core services to each organization, and in many systems, this level of customization is not possible.

Furthermore, many customizations of core services require system reboots which effect all of the organizations that have virtual partitions on the same server. For this reason, many service providers do not offer customizations of core services, or they require changes to be made during a scheduled maintenance window that may be inconvenient and not timely enough for the requesting organization.

Moreover, it may be desirable for an organization to share their customizations with other organizations or with other virtual partitions associated with the same organization. In current enterprise systems, this can add significant overhead and can introduce management problems related to keeping track of each virtual partition's customizations.

SUMMARY

One embodiment of the present invention provides a system that facilitates managing metadata associated with entities and entity types in a computing system. During operation, the system initializes a global static metadata cache containing global static metadata at the computing system. Next, the system initializes a global dynamic metadata cache containing global dynamic metadata at the computing system. The system then receives a command to initialize a session at the computing system. In response to the command, the system determines a realm for the session, wherein the realm is a virtual private partition of the computing system. The system then initializes a realm-scoped dynamic metadata cache containing realm-scoped dynamic metadata associated with the realm at the computing system. Finally, the system executes operations on the computing system in compliance with the global static metadata, the global dynamic metadata, and the realm-scoped dynamic metadata.

In some embodiments of the present invention, the system receives a request to modify an entity type on the computing system, wherein the modification can include creating a new entity type. In response to the request, the system identifies an item of realm-scoped dynamic metadata that is associated with the entity type. Next, the system determines a delta between the item of realm-scoped dynamic metadata and a replacement item of realm-scoped dynamic metadata that is associated with the entity type and includes the modification. The system also determines if the delta violates a constraint. If so, the system rejects the modification. If not, the system overwrites the realm-scoped dynamic metadata cache with a new realm-scoped dynamic metadata cache that includes the replacement item of realm-scoped dynamic metadata, and commits the modification.

In some embodiments of the present invention, the system receives a request to modify an entity type on the computing system, wherein the modification can include the creation of a new entity type. In response to the request, the system identifies an item of global dynamic metadata that is associated with the entity type. Next, the system determines a delta between the item of global dynamic metadata and a replacement item of global dynamic metadata that is associated with the entity type and includes the modification. The system also determines if the delta violates a constraint. If so, the system rejects the modification. However, if not, the system overwrites the global dynamic metadata cache with a new global dynamic metadata cache that includes the replacement item of global dynamic metadata, and commits the modification.

In some embodiments of the present invention, the global static metadata cache, the global dynamic metadata cache, and the realm-scoped dynamic metadata cache are stored in a database.

In some embodiments of the present invention, the global static metadata cache, the global dynamic metadata cache, and the realm-scoped dynamic metadata cache are saved in one or more eXtensible Markup Language (XML) files.

In some embodiments of the present invention, updating either the global dynamic metadata cache or the realm-scoped dynamic metadata cache does not require a reboot of the computing system.

In some embodiments of the present invention, the global static metadata cache is configured at compile time.

In some embodiments of the present invention, the global dynamic metadata cache can be configured as early as compile time or as late as run-time.

In some embodiments of the present invention, the global static metadata is arranged as one or more global static metadata caches.

In some embodiments of the present invention, the entities and entity types are one of a Java entity or entity type or a C# entity or entity type.

In some embodiments of the present invention, the computing system can include one of a standalone system or a clustered enterprise system.

In some embodiments of the present invention, the system exports the realm-scoped dynamic metadata into a second realm.

DETAILED DESCRIPTION

Figure 1:
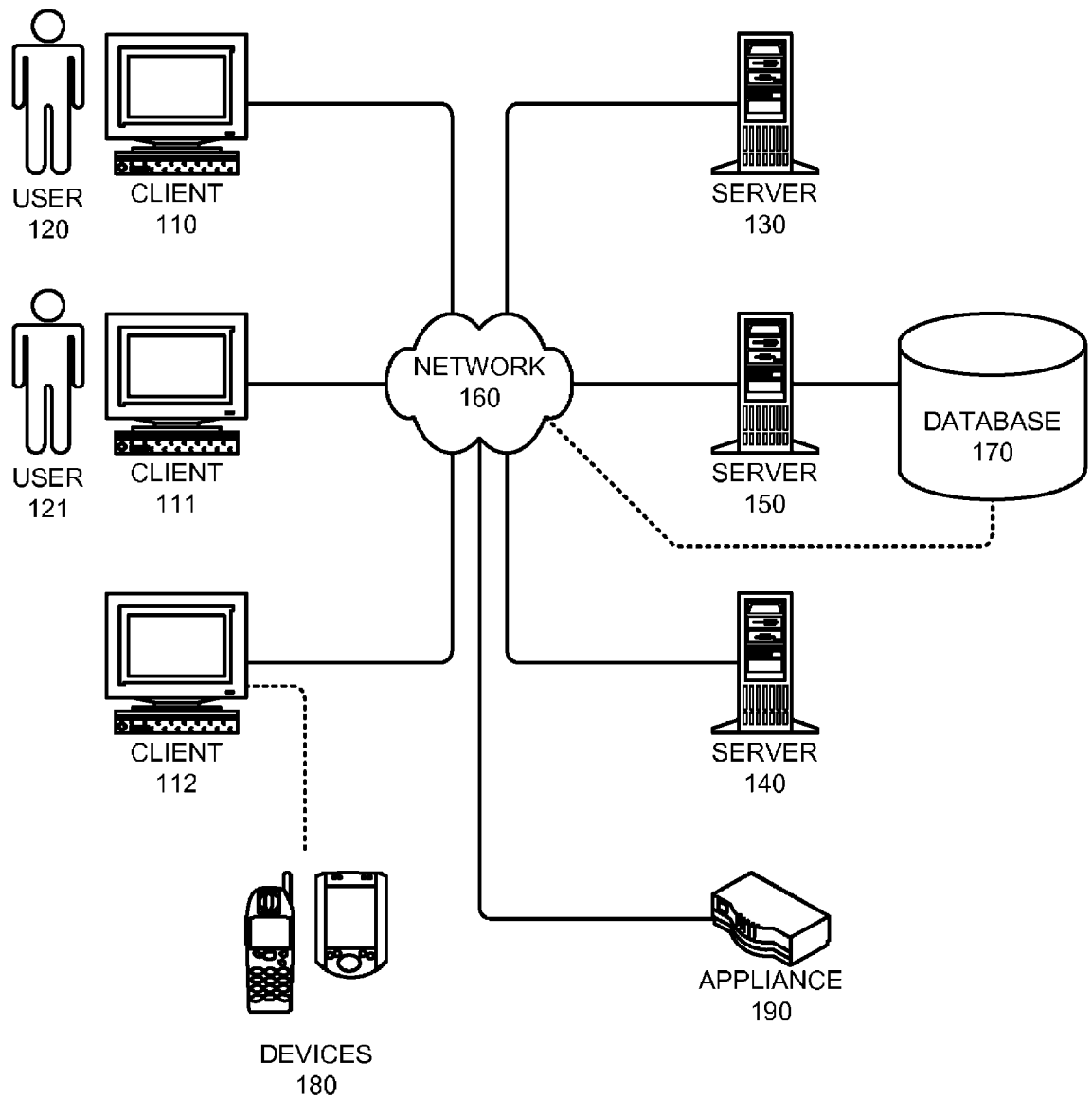
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

Embodiments of the present invention deal with metadata and metadata caches. For embodiments of the present invention, metadata is defined as data that defines Object-Oriented Programming (OOP) entities. For every OOP class that is an entity, a corresponding metadata object defines the entity type and the entity properties. For example, the metadata may define a regular-expression constraint if the property type is a string.

Embodiments of the present invention present a meta-model represented at runtime by a set of static and dynamic entity types and property definitions in the form of Java and C# objects. These entity types are managed by a metadata cache. Unlike on many systems, new globally visible types can be added to the cache while the system is running without requiring a system reboot. In addition, changes (including removing property definitions) can be made to the types that are scoped to a single realm. Note that a realm is a virtual partition that encompasses a group of entities and entity types, such a company or user (realms restrict visibility based on login). Users in other realms cannot see the types in one realm, and this includes types that customize globally visible types.

Note that each realm can have a different set of customizations and specializations of global types. In some embodiments, modifications to types taking place in the same realm on different application servers are allowed, and the design avoids concurrency issues and data-corruption problems.

In some embodiments of the present invention, metadata is either global static, global dynamic, or realm-scoped dynamic. Moreover, all of the metadata of a particular kind is held in a metadata object. References are held to the global static and global dynamic metadata objects. Note that the global static reference is typically never updated on a running system (updates to the global static metadata typically requires a system reboot). Global dynamic metadata is updated in an offline copy of the metadata, and then the new metadata object overwrites the one held by the reference. Note that clients that hold actual pointers to the types in the previous metadata are not affected, because these objects are shallow-copied to the new metadata object as part of cache re-initialization.

The system typically re-computes realm-scoped dynamic metadata in an offline metadata object, and then uses the recomputed realm-scoped dynamic metadata to overwrite the object held by the realm-scoped metadata reference. A map of realm IDs to metadata references holds the metadata for all currently active realms.

In some embodiments of the present invention, the realm-scoped dynamic metadata is loaded for a realm on first access, or on first login, depending on the system configuration. To avoid updates to the same cache in a realm at the same type, a lock is acquired on the reference for that realm. Deltas between old and new versions of the types in a realm are computed during cache re-initialization, and are saved to the database in the form of update statements.

Note that because the system can always migrate data from one version to another even though the system may no longer have the type that defined the original data, the system can allow in-flight writes of stale data to succeed. Concurrency across a cluster is not a problem for cache updates, because an attempt to save a dynamic type (which is what triggers an update) when the type has an out-of-date version number causes an exception to be thrown that negates the entire attempt (and ensures that no update statement is recorded in the database).

One embodiment of the present invention provides a system that facilitates managing metadata associated with entities and entity types in a computing system. During operation, the system initializes a global static metadata cache containing global static metadata at the computing system. Next, the system initializes a global dynamic metadata cache containing global dynamic metadata at the computing system. The system then receives a command to initialize a session at the computing system. In response to the command, the system determines a realm for the session, wherein the realm is a virtual private partition of the computing system. The system then initializes a realm-scoped dynamic metadata cache containing realm-scoped dynamic metadata associated with the realm at the computing system. Finally, the system executes operations on the computing system in compliance with the global static metadata, the global dynamic metadata, and the realm-scoped dynamic metadata.

For example, consider the case where an organization is hosting an online clothing store on one virtual partition (or realm) on an enterprise server. In this example, the global static metadata may define core system entities and entity types such as invoices, users, products, etc. that are known at compile time, do not change on a running system, and are common to all realms on the system. The global dynamic metadata may define entities and entity types that are visible to all users, may be known at compile time or be defined dynamically, and are added to a running system without restarting the system. For example, the global dynamic metadata may include business tax forms that are released every month with updates; or the global dynamic metadata may define types that customize or dynamically specialize types defined in the global static metadata or global dynamic metadata.

Finally, the realm-scoped dynamic metadata may include definitions for entities and entity types that are relevant to the current realm. For example, for an online clothing store, a user might customize the store's invoices to have an approval checkbox, but that checkbox would only be seen on invoices in that realm. As another example, the base product type in the global static metadata may be dynamically specialized into "shirts" and "shoes", which again would only be seen in that realm.

Note that any metadata object may modify any entity type in the system that permits that kind of modification, and there is no limitation to the number or levels of modification. For instance, using the example above, the products could be further dynamically specialized into "mens' shirts", "women's shirts", "men's shoes", and "women's shoes".

In some embodiments of the present invention, the system receives a request to modify an entity type on the computing system, wherein the modification can include creating a new entity type. Note that in some embodiments of the present invention, it may be necessary to prohibit the deletion of an entity type if the type has already been used in the realm, or is extended by any other types. In response to the request, the system identifies an item of realm-scoped dynamic metadata that is associated with the entity type. Next, the system determines a delta between the item of realm-scoped dynamic metadata and a replacement item of realm-scoped dynamic metadata that is associated with the entity type and includes the modification. The system also determines if the delta violates a constraint. If so, the system rejects the modification. However, if not, the system overwrites the realm-scoped dynamic metadata object with a new realm-scoped dynamic metadata object that includes the replacement item of realm-scoped dynamic object, and commits the modification.

In many cases, while modifying realm-scoped dynamic metadata, it may be necessary to obtain a per-realm lock to prevent interference from other processes that may try to access the realm-scoped dynamic metadata. Also note that updates to the local metadata only requires an update of the local realm, and all other realms on the same system are unaffected.

In some embodiments of the present invention, the global static metadata, the global dynamic metadata, and the realm-scoped dynamic metadata are stored in a database, while in other embodiments of the present invention, the global static metadata, the global dynamic metadata, and the realm-scoped dynamic metadata are saved in one or more eXtensible Markup Language (XML) files. In some embodiments, the metadata is stored in both storage mediums. Note that both storage mediums provide benefits to the system. By storing the metadata in the database, the system may leverage the database's query tools to provide query access to the metadata. Furthermore, by using XML files, the system may operate in environments where a database is impractical.

Note that SQL is mentioned throughout the instant application for illustrative purposes. However, any database vendor and any database technology may be used to implement embodiments of the present invention.

In some embodiments of the present invention, the global dynamic metadata is arranged as more than one object. Note that it may be beneficial to break-up the metadata according to any number of logic divisions. For example, an accounting system may have a different metadata object for each tax year. These separate metadata objects may be independently loadable, and may be unloaded according to a least-recently-used (LRU) algorithm, or some other applicable algorithm.

In some embodiments of the present invention, the realm-scoped dynamic metadata for a realm may be unloaded according to a time-to-live algorithm, some other applicable algorithm, or by some form of notification when the last user logs out of the realm.

In some embodiments of the present invention, the entities and entity types are one of a Java entity or entity type or a C# entity or entity type. While Java and C# are discussed in the Instant Application, embodiments of the present invention work equally well with any object-oriented programming language.

In some embodiments of the present invention, the system exports one or more types from realm-scoped dynamic metadata into a second realm. For example, a business might customize and/or dynamically specialize their realm-scoped dynamic metadata to add many custom fields to their invoices, and many different products for their online store's product catalog. If this business has multiple storefronts hosted on different virtual partitions, it would be highly desirable to be able to export some or all of the realm-scoped dynamic metadata from one online store, and import this metadata into the remaining virtual partitions hosting the other online stores. Furthermore, libraries of customizations and/or dynamic specializations can be built and maintained to reduce repetitive tasks and to provide value-added services for new organizations.

Some embodiments of the present invention provide a Graphical User Interface (GUI) that facilitates customizations and dynamic specializations of the metadata.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, devices 180, and appliance 190.

Clients 110-112 can include any node on a network including computational capability and including a mechanism for communicating across the network.

Similarly, servers 130-150 can generally include any node on a network including a mechanism for servicing requests from a client for computational and/or data storage resources. Servers 130-150 can participate in an advanced computing cluster, or can act as stand-alone servers. In one embodiment of the present invention, server 140 is an online "hot spare" of server 150.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network.

Devices 180 can include any type of electronic device that can be coupled to a client, such as client 112. This includes, but is not limited to, cell phones, Personal Digital Assistants (PDAs), smart-phones, personal music players (such as MP3 players), gaming systems, digital cameras, portable storage media, or any other device that can be coupled to the client. Note that in some embodiments of the present invention, devices 180 can be coupled directly to network 160 and can function in the same manner as clients 110-112.

Appliance 190 can include any type of appliance that can be coupled to network 160. This includes, but is not limited to, routers, switches, load balancers, network accelerators, and specialty processors. Appliance 190 may act as a gateway, a proxy, or a translator between server 140 and network 160.

Note that different embodiments of the present invention may use different configurations, and are not limited to the configuration illustrated in computing environment 100. For example, embodiments of the present invention work both in a clustered server environment, and on a standalone server.

Entity Type Table

Figure 2:
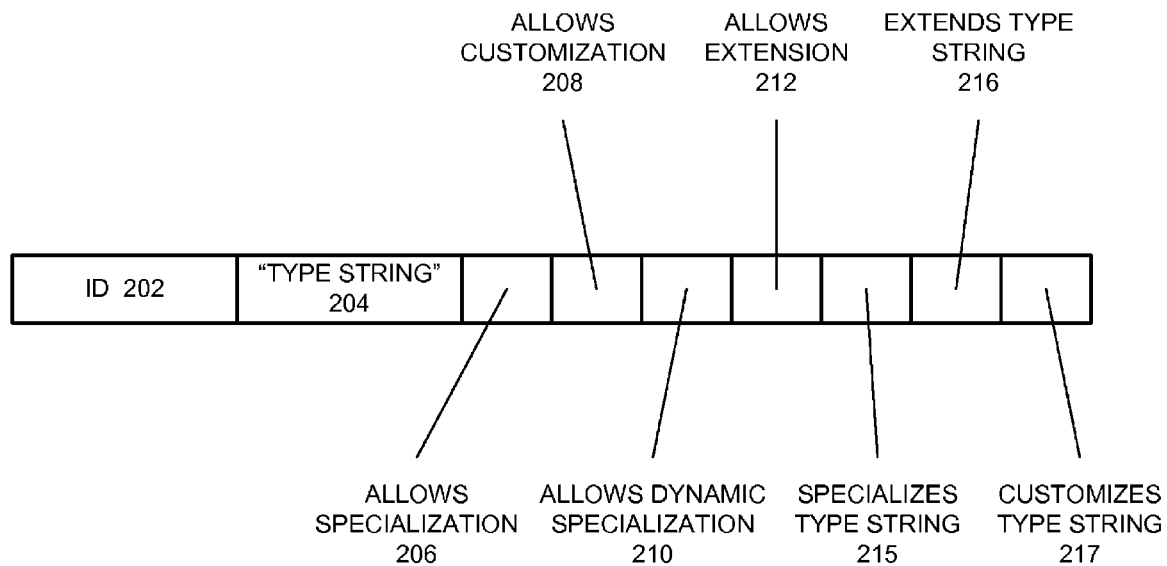
FIG. 2 illustrates an entity type table in accordance with an embodiment of the present invention.

FIG. 2 illustrates an entity type table 200 in accordance with an embodiment of the present invention. Entity type table 200 includes a row for each entity type that is managed by a metadata object in the various metadata objects. Entity type table 200 includes an ID column 202, a "type string" column 204, an "allows specialization" column 206, an "allows customization" column 208, an "allows dynamic specialization" column 210, an "allows extension" column 212, a "specializes type string" column 215, an "extends type string" column 216, and a "customizes type string" column 217. Note that other embodiments of the present invention may include different columns in the entity type table and are not limited to those illustrated in FIG. 2.

In the exemplary embodiment shown in FIG. 2, ID column 202 includes identifiers for each entity type stored in entity type table 200. In one embodiment of the present invention, ID column 202 contains Globally Unique Identifiers (GUIDs).

"Type string" column 204 includes a string that names each type that the metadata object is describing. "Allows specialization" column 206, "allows customization" column 208, "allows dynamic specialization" column 210, and "allows extension" column 212 are Boolean columns that indicate whether each entity type is able to be customized, specialized, or extended, accordingly. "Specializes type string" column 215, "extends type string" column 216, and "customizes type string" column 217 specify which other entity types are specialized or dynamically specialized, extended, or customized by the current entity type.

Property Definition Table

Figure 3:
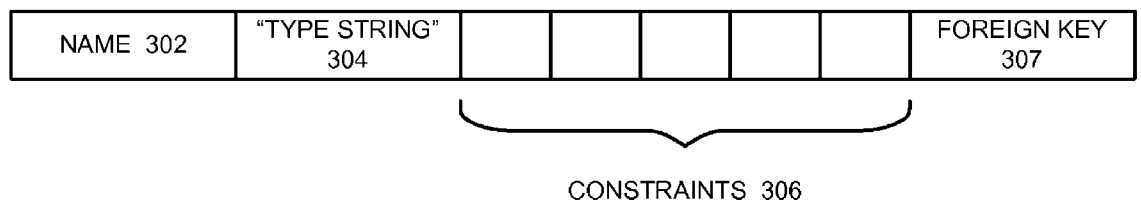
FIG. 3 illustrates property definition type table in accordance with an embodiment of the present invention.

FIG. 3 illustrates property definition table 300 in accordance with an embodiment of the present invention. Property definition table 300 includes name column 302, "type string" column 304, and constraint columns 306. Name column 302 includes the names of the properties defined for the various entity types in entity type table 200. "Type string" column 304 includes strings that name the type of each property being defined, such as "Integer" or "Boolean".

Constraint columns 306 list various constraints that can be applied to each property. Note that each property type will only use a subset of constraint columns 306. For example, if the type string of a property is "string" the system might store a regular-expression constraint in a string column in constraint columns 306. However, if the type string of a property is "integer," the system may use a column in constraint columns 306 to define a minimum value for the property and another column in constraint columns 306 to define a maximum value.

Constraint columns 306 may comprise a virtually unlimited number of columns in order to provide any foreseeable type of property definition.

Foreign-key column 307 links each row in property definition table 300 with corresponding rows in entity type table 200, such that each property definition is linked to its corresponding entity type.

The type strings stored in "type string" column 204 and "type string" column 304 are canonical strings, and are portable so they work in various OOP languages. In order to maintain portability, type strings may include an assembly name, a name space, a type namespace, and a name of the type itself.

Note that use of these tables allows the system to quickly locate all property definitions that belong to a specific entity type.

Persisting Entities Modified by Dynamic Types

In some embodiments of the present invention, when an entity type that is customized or dynamically specialized is saved, its dynamic values are read from the entity type and saved to a table of dynamic values. When an entity type that is customized or dynamically specialized is read from the database, its dynamic values are read from the table of dynamic values and set in the entity type. When an entity type that is customized or dynamically specialized is deleted, its dynamic values are removed from the table of dynamic values.

Modifying Metadata Objects

Figure 4:
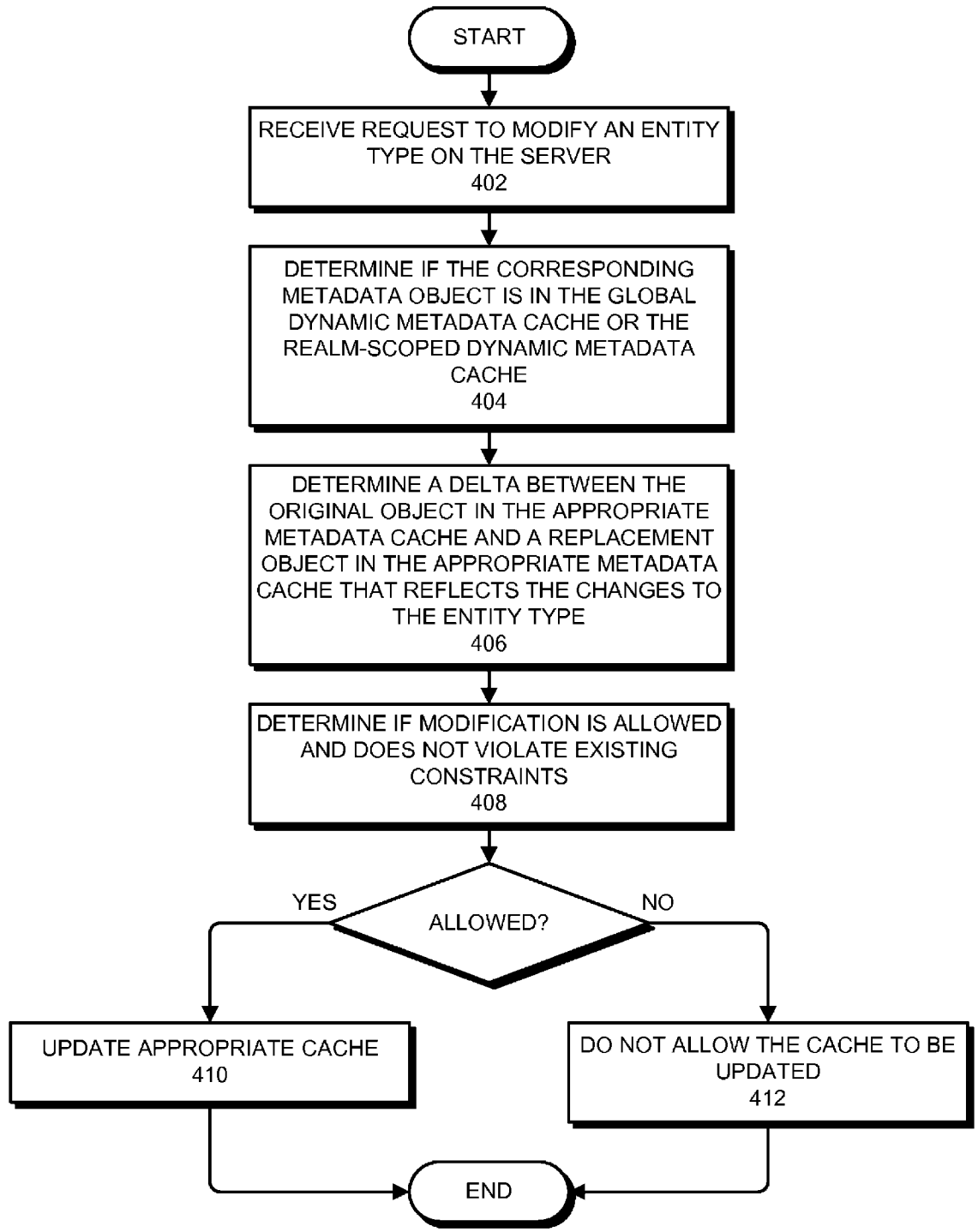
FIG. 4 presents a flowchart illustrating the process of modifying metadata objects in accordance with an embodiment of the present invention.

FIG. 4 presents a flowchart illustrating the process of modifying metadata objects in accordance with an embodiment of the present invention. During operation, the system receives a request to modify an entity type on server 150 (operation 402). The system then determines if the corresponding metadata object for the entity type is in the global dynamic metadata cache or the realm-scoped dynamic metadata cache (operation 404). Next, the system determines a delta between the original object in the appropriate metadata cache and a replacement object in the appropriate metadata cache that reflects the changes to the entity type (operation 406).

The system also determines if the modification to the entity type is allowed and if the modification does not violate any existing constraints (operation 408). If so, the system overwrites the appropriate cache (operation 410). Note that in the case of the realm-scoped dynamic metadata cache, the system may have to obtain a per-realm lock. If not, the system does not allow the cache to be updated (operation 412).

When a dynamic entity type is modified by adding a property definition to the dynamic entity type, the new property definition is assigned a column position in the table of dynamic values, and all existing rows in the table that were saved with that particular type are updated to have the default value of the property definition in that column. When a dynamic entity type is modified by removing a property definition from dynamic entity type, all rows in the table of dynamic values that were saved with that particular type are updated to have a null the column that had stored values for the deleted property definition.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for managing metadata associated with entities and entity types in a computing system, the method comprising:

initializing a global static metadata cache containing global static metadata at the computing system, wherein the global static metadata comprises definitions for core entities and entity types for the computing system;

initializing a global dynamic metadata cache containing global dynamic metadata at the computing system, wherein the global dynamic metadata comprises definitions for entities and entity types for the computing system that can be changed without requiring a reboot;

receiving a command to initialize a session at the computing system;

determining a realm for the session, wherein the realm is a virtual private partition of the computing system;

initializing a realm-scoped dynamic metadata cache containing realm-scoped dynamic metadata associated with the realm at the computing system, wherein the realm-scoped dynamic metadata comprises definitions for entities and entity types for the realm; and executing operations on the computing system in compliance with the global static metadata, the global dynamic metadata, and the realm-scoped dynamic metadata.

2. The method of claim 1, further comprising:

receiving a request to modify an entity type on the computing system, wherein the modification can include creating a new entity type;

in response to the request, identifying an item of realm-scoped dynamic metadata that is associated with the entity type;

determining a delta between the item of realm-scoped dynamic metadata and a replacement item of realm-scoped dynamic metadata that is associated with the entity type and includes the modification;

determining if the delta violates a constraint;

if so, rejecting the modification; and if not, overwriting the realm-scoped dynamic metadata cache with a new realm-scoped dynamic metadata cache that includes the replacement item of realm-scoped dynamic metadata, and committing the modification.

3. The method of claim 1, further comprising:

receiving a request to modify an entity type on the computing system, wherein the modification can include creating a new entity type;

in response to the request, identifying an item of global dynamic metadata that is associated with the entity type;

determining a delta between the item of global dynamic metadata and a replacement item of global dynamic metadata that is associated with the entity type and includes the modification;

determining if the delta violates a constraint;

if so, rejecting the modification; and if not, overwriting the global dynamic metadata cache with a new global dynamic metadata cache that includes the replacement item of global dynamic metadata, and committing the modification.

4. The method of claim 1, wherein the global static metadata cache, the global dynamic metadata cache, and the realm-scoped dynamic metadata cache are stored in a database.

5. The method of claim 1, wherein the global static metadata cache, the global dynamic metadata cache, and the realm-scoped dynamic metadata cache are saved in one or more eXtensible Markup Language (XML) files.

6. The method of claim 1, wherein updating either the global dynamic metadata cache or the realm-scoped dynamic metadata cache does not require a reboot of the computing system.

7. The method of claim 1, wherein the global static metadata cache is configured at compile time.

8. The method of claim 1, wherein the global dynamic metadata cache can be configured as early as compile time or as late as run-time.

9. The method of claim 1, wherein the global static metadata is arranged as one or more global static metadata caches.

10. The method of claim 1, wherein the entity types are one of a Java entity type or a C# entity type.

11. The method of claim 1, wherein the computing system can include one of a standalone system or a clustered enterprise system.

12. The method of claim 1, further comprising exporting the realm-scoped dynamic metadata into a second realm.

13. A computer-readable storage medium storing instructions that when executed by a computer cause the computer to perform a method for managing metadata associated with entities and entity types in a computing system, the method comprising:

initializing a global static metadata cache containing global static metadata at the computing system, wherein the global static metadata comprises definitions for core entities and entity types for the computing system;

initializing a global dynamic metadata cache containing global dynamic metadata at the computing system, wherein the global dynamic metadata comprises definitions for entities and entity types for the computing system that can be changed without requiring a reboot;

receiving a command to initialize a session at the computing system;

determining a realm for the session, wherein the realm is a virtual private partition of the computing system;

initializing a realm-scoped dynamic metadata cache containing realm-scoped dynamic metadata associated with the realm at the computing system, wherein the realm-scoped dynamic metadata comprises definitions for entities and entity types for the realm; and executing operations on the computing system in compliance with the global static metadata, the global dynamic metadata, and the realm-scoped dynamic metadata.

14. The computer-readable storage medium of claim 13, wherein the method further comprises:

receiving a request to modify an entity type on the computing system, wherein the modification can include creating a new entity type;

in response to the request, identifying an item of realm-scoped dynamic metadata that is associated with the entity type;

determining a delta between the item of realm-scoped dynamic metadata and a replacement item of realm-scoped dynamic metadata that is associated with the entity type and includes the modification;

determining if the delta violates a constraint;

if so, rejecting the modification; and if not, overwriting the realm-scoped dynamic metadata cache with a new realm-scoped dynamic metadata cache that includes the replacement item of realm-scoped dynamic metadata, and committing the modification.

15. The computer-readable storage medium of claim 13, wherein the method further comprises:

receiving a request to modify an entity type on the computing system, wherein the modification can include creating a new entity type;

in response to the request, identifying an item of global dynamic metadata that is associated with the entity type;

determining a delta between the item of global dynamic metadata and a replacement item of global dynamic metadata that is associated with the entity type and includes the modification;

determining if the delta violates a constraint;

if so, rejecting the modification; and if not, overwriting the global dynamic metadata cache with a new global dynamic metadata cache that includes the replacement item of global dynamic metadata, and committing the modification.

16. The computer-readable storage medium of claim 13, wherein the global static metadata cache, the global dynamic metadata cache, and the realm-scoped dynamic metadata cache are stored in a database.

17. The computer-readable storage medium of claim 13, wherein the global static metadata cache, the global dynamic metadata cache, and the realm-scoped dynamic metadata cache are saved in one or more eXtensible Markup Language (XML) files.

18. The computer-readable storage medium of claim 13, wherein updating either the global dynamic metadata cache or the realm-scoped dynamic metadata cache does not require a reboot of the computing system.

19. The computer-readable storage medium of claim 13, wherein the global static metadata cache is configured at compile time.

20. The computer-readable storage medium of claim 13, wherein the global dynamic metadata cache can be configured as early as compile time or as late as run-time.

21. The computer-readable storage medium of claim 13, wherein the global static metadata is arranged as one or more global static metadata caches.

22. The computer-readable storage medium of claim 13, wherein the entity types are one of a Java entity type or a C# entity type.

23. The computer-readable storage medium of claim 13, wherein the computing system can include one of a standalone system or a clustered enterprise system.

24. The computer-readable storage medium of claim 13, wherein the method further comprises exporting the realm-scoped dynamic metadata into a second realm.

25. An apparatus configured to manage metadata associated with entities and entity types in a computing system, comprising:
an initialization mechanism configured to initialize a global static metadata cache containing global static metadata at the computing system,
wherein the global static metadata comprises definitions for core entities and entity types for the computing system;
wherein the initialization mechanism is further configured to initialize a global dynamic metadata cache containing global dynamic metadata at the computing system, wherein the global dynamic metadata comprises definitions for entities and entity types for the computing system that can be changed without requiring a reboot;
a receiving mechanism configured to receive a command to initialize a session at the computing system;
a determination mechanism configured to determine a realm for the session, wherein the realm is a virtual private partition of the computing system;
wherein the initialization mechanism is further configured to initialize a realm-scoped dynamic metadata cache containing realm-scoped dynamic metadata associated with the realm at the computing system, wherein the realm-scoped dynamic metadata comprises definitions for entities and entity types for the realm; and
an execution mechanism configured to execute operations on the computing system in compliance with the global static metadata, the global dynamic metadata, and the realm-scoped dynamic metadata.

* * * * *